(No Model.)
P. GENDRON.
VEHICLE WHEEL.
No. 434,146.  Patented Aug. 12, 1890.
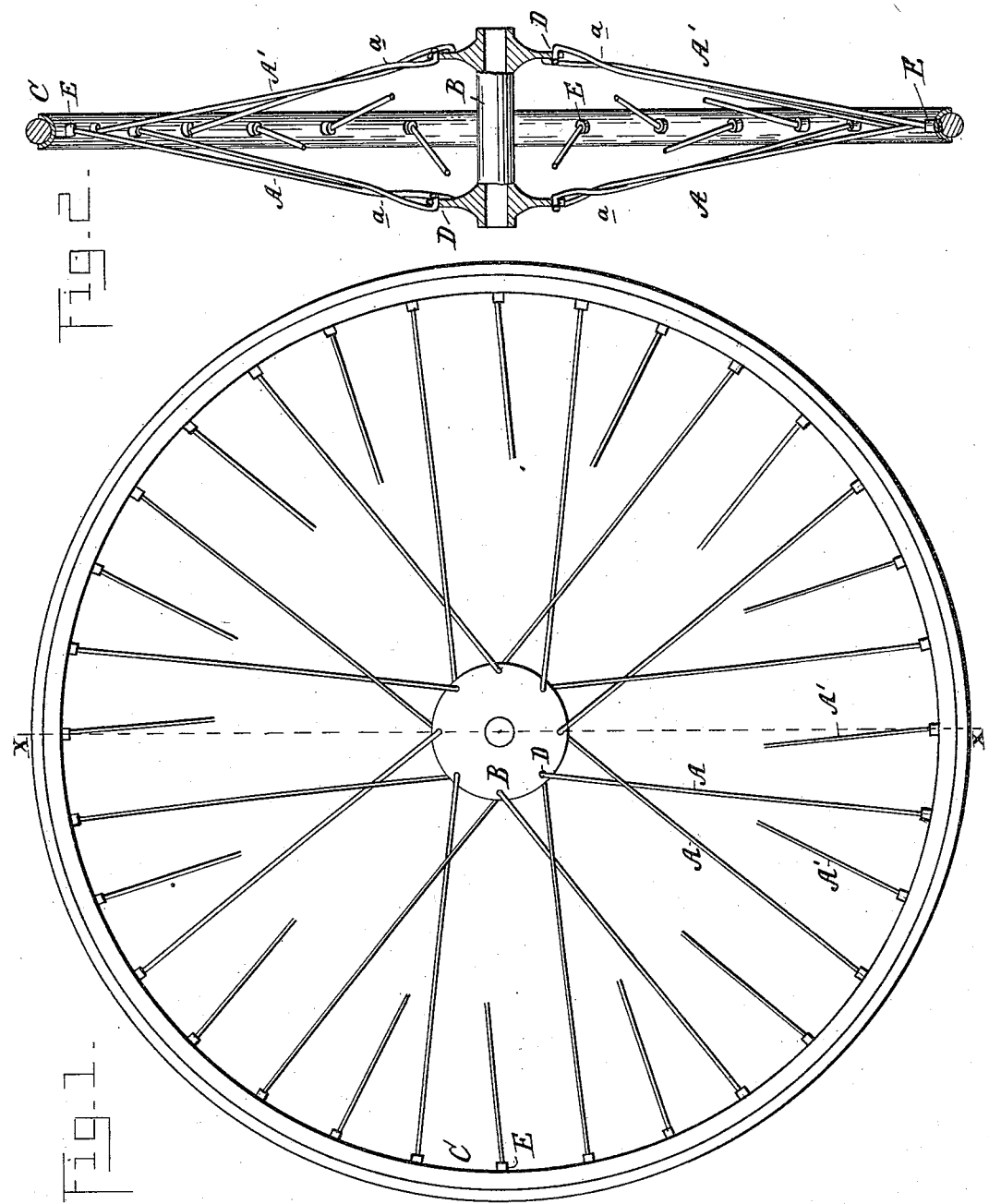
Witnesses:
Geo. A. Gregg.
N. L. Lindop.
Inventor,
Peter Gendron
By James Whittemore
Atty.

UNITED STATES PATENT OFFICE.

PETER GENDRON, OF TOLEDO, OHIO, ASSIGNOR TO THE GENDRON IRON WHEEL COMPANY, OF SAME PLACE.

VEHICLE-WHEEL.

SPECIFICATION forming part of Letters Patent No. 434,146, dated August 12, 1890.

Application filed May 12, 1890. Serial No. 351,408. (No model.)

*To all whom it may concern:*

Be it known that I, PETER GENDRON, a citizen of the United States, residing at Toledo, in the county of Lucas and State of Ohio, have invented certain new and useful Improvements in Vehicle-Wheels, of which the following is a specification, reference being had therein to the accompanying drawings.

This invention relates to new and useful improvements in vehicle-wheels of that class in which the spokes are made of wire and cross each other, as in the so-called "tangent-spoke wheels," used for bicycles, tricycles, and other like vehicles; and the invention consists in the peculiar arrangement of the metal spokes in wheels of this kind whereby the rattling of the spokes through their vibration when the wheel is in motion is prevented, all as more fully hereinafter described, and shown in the accompanying drawings, in which—

Figure 1 is an elevation of a wire-spoke vehicle-wheel of the kind to which my invention is desired to be applied and in which the spokes on the front side of the wheel are shown as arranged in accordance with my invention. The spokes on the other side, which are intended to be arranged in like manner, are broken away for the sake of clearness. Fig. 2 is a central section through the wheel on line $x$ $x$.

The wheel shown in the drawings is of a well-known type, as in general use for bicycle and tricycle wheels, being composed of two sets of spokes A A', extending from opposite sides of the hub B to the rim C, each set being formed of so-called "tangent spokes," constructed in pairs of one piece of wire, which engages into a spoke-passage D in the flanges of the hub and is secured with its ends to the metal rim by riveting, or, as more common in the better class of wheels, by screw-nipples E, by means of which the tension of the spokes may be regulated. In a wheel of this kind as now constructed the spokes on each side of the wheel cross each other—that is, each spoke is crossed by an adjacent spoke on each side of the wheel; but it will be seen that of each two spokes crossing each other one runs to the inside of the hub-flange and the other to the outside of the same hub-flange. Now, in the present construction the spoke passing to the outside of the hub-flange crosses the other spoke on the outside, and, vice versa, the spoke passing to the inside of the hub-flange crosses the other spoke on the inside—that is, the spokes cross each other freely, as the thickness of the hub-flange keeps them more or less apart.

My invention consists in crossing the spokes just the opposite way—that is, each two spokes in crossing each other, the one passing to the inside of the hub-flange is made to cross the other spoke on the outside of the spokes, thus becoming interlaced.

The advantage of this improvement consists in thereby accomplishing the result of causing the two spokes at their point of crossing to bind each other, as shown in Fig. 2, at the points marked $a$, the tension of the spokes being sufficient to completely effect this result, so that the spokes will not rattle when the wheel is in motion. The same object is accomplished with the present construction of wheel by winding or tying the spokes at their point of crossing with small wire; but in practice this is very annoying in different ways—as, for instance, in cleaning the wheels or in replacing broken spokes.

What I claim as my invention is—

A tangent-wire-spoke wheel having its spokes on each side of the wheel formed in pairs of one piece of wire secured in wire-passages in two hub-flanges on the opposite sides of the wheels, each spoke extending from the inside of the flange and crossing the outside of its adjacent outer spoke and being interlaced therewith at the point of crossing, substantially as described.

In testimony whereof I affix my signature in presence of two witnesses.

PETER GENDRON.

Witnesses:
ED. MCBREARTY,
M. B. O'DOGHERTY.